United States Patent Office 3,564,373
Patented Feb. 16, 1971

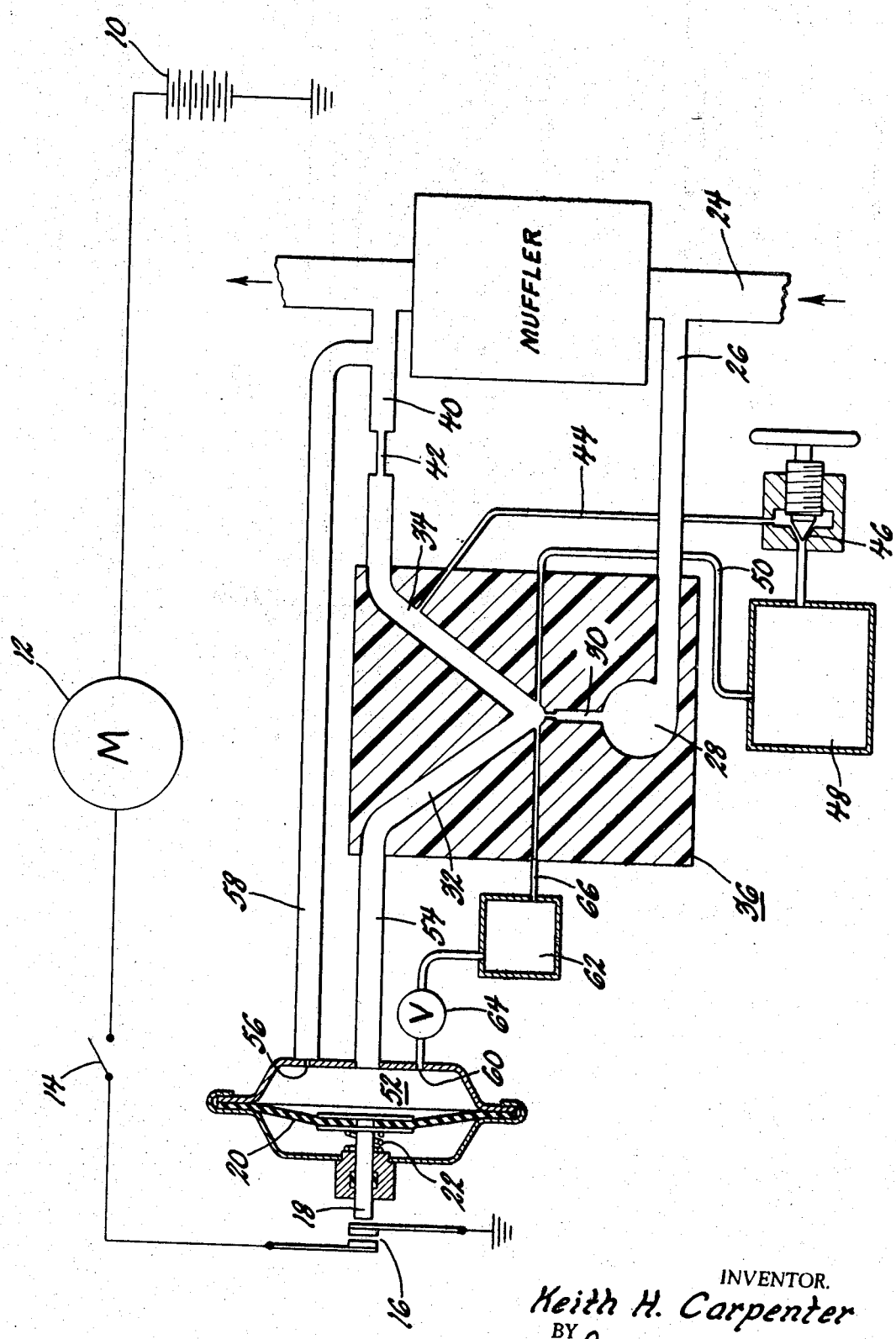

3,564,373
PULSE CONTROL WIPER
Keith H. Carpenter, Kettering, Ohio, assignor to General Motors Corporation, Detroit, Mich., a corporation of Delaware
Filed Dec. 23, 1965, Ser. No. 515,855
Int. Cl. H02p 1/04
U.S. Cl. 318—443                                           3 Claims

ABSTRACT OF THE DISCLOSURE

In a preferred form, this disclosure relates to a pulse type windshield wiping system for wiping the windshield of a vehicle. The system includes a drive motor which is adapted to be intermittently energized for moving windshield wipers across the windshield through one cycle of operation each time it is energized. The system further includes a switch means in an electric circuit with the motor for controlling energization and de-energization thereof, a pressure responsive means operable to effect movement of a switch element of the switch means to closed and open positions in response to pressurized exhaust gases from the engine being supplied and not supplied thereto, respectively, and a fluid amplifier means for directing the exhaust gases to the pressure responsive means at periodic intervals whereby the drive motor is caused to be intermittently energized.

---

This invention relates to windshield wiping mechanism and more particularly to a pulse wiper controlled by exhaust gases from an internal combustion engine.

It is an object of the present invention to provide an improved control system for a pulse wiper responding to pressure buildups induced by an engine exhaust system and controlled by a fluid amplifier.

It is another object of the present invention to provide an improved pulse wiper control within the concept of the aforementioned object that utilizes a feedback circuit for controlling the frequency of operation of a pulse wiper.

Further objects and advantages of the present invention will be apparent from the following description, reference being had to the accompanying drawing wherein a preferred embodiment of the present invention is clearly shown.

In the single figure drawing, the subject invention is diagrammatically shown with the control portion shown in section.

Referring to the drawing, a battery 10 supplies electrical power to a motor 12 through an OFF–ON switch 14 as controlled by the position of switching element 16. Switching elements 16 are moved into engagement selectively by movement of plunger 18 moving in response to diaphragm 20. Diaphragm 20 is moved against the force of spring 22 in a manner hereinafter described.

Exhaust gases from the engine exhaust manifold are tapped from line 24 by means of line 26. Line 26 communicates with collector chamber 28 and passage 30 to direct a jet of exhaust gases in either leg 32 or leg 34 of a fluid amplifier, generally designated by numeral 36. Leg 34 communicates with passage 40 which returns the exhaust gases to exhaust line 24. Orifice 42 in passage 40 causes a build-up of exhaust pressure in leg 34, which build-up is communicated through line 44 through adjustable orifice 46 into capacitance or collector 48. Capacitance 48 communicates with the outlet area of passage 30 through line 50.

Leg 32 of fluid amplifier 36 communicates with chamber 52 formed on one side of diaphragm 20 by way of passage 54. Chamber 52 has an outlet orifice 56 into line 58 which provides a path for fluid communication between chamber 52 and passage 40. Outlet orifice 60 communicates with chamber 62 through valve 64. Chamber 62 communicates with the outlet portion of passage 30 of fluid amplifier 36 through line 66 having an outlet near leg 32 at the outlet of passage 30 in contradistinction to line 50 having an outlet near the outlet of passage 30 on the side of leg 34.

In operation, the subject mechanism is designed to selectively operate motor 12 which drives windshield wipers for a motor vehicle in a selective manner. The windshield wiping system is a pulse type system in which motor 12 is operative to drive the wipers across the windshield during one operating cycle at a constant speed. After one cycle is completed, motor 12 is stopped. The dwell time between operating cycles of motor 12 determines the frequency of operation and it is this frequency that is controlled by the subject invention.

Referring to the drawing, when switch 14 is closed, a path for current flow exists between the battery 10 and switching elements 16 which are normally open. When these switching elements 16 are closed, the motor operates and a wiping cycle takes place. When switching elements 16 are open, no wiping takes place. The opening and closing of switching elements 16 is dependent upon movement of plunger 18 which in turn is caused by a deflection of diaphragm 20 when pressure in chamber 52 exceeds the force needed to overcome spring 22.

When it is desired to operate the subject wiping system, switch 14 is closed, exhaust gases from line 24 enter line 26 and pressurize collector chamber 28. The restricted passage 30 emits a jet type stream which in turn attaches to either leg 32 or leg 34 of fluid amplifier 36. For purposes of this explanation, it will be assumed that attachment is experienced first in leg 34.

With the jet stream of exhaust gases entering leg 34, a flow is had through orifice 42 back into line 24. However, due to the restriction at orifice 42, a pressure build-up is experienced in leg 34 which results in a pressure being communicated through line 44 and adjustable orifice into capacitance 48. Pressure builds up in capacitance 48 after a time as determined by the setting of adjustable orifice 46 and is transmitted through line 50 to a point near the outlet of passage 30 on the side of leg 34. With the input of pressure from line 50, the fluid stream into leg 34 is deflected into leg 32 resulting in a flow through passage 54 into chamber 52. Pressure will build up in chamber 52 due to the restrictions 56 and 60 resulting in a deflection of diaphragm 20 toward the left as viewed in the drawing. Plunger 18 will move also toward the left with the diaphragm 20 closing switching element 16. With the closing of switching element 16, a path to ground for the motor 12 is provided which energizes the motor and causes the wipers to go through one operating cycle.

Normally a flow will be experienced through orifice 60 into chamber 62 and on through line 66 back into the area near the outlet of passage 30 on the side of leg 32. The size of chamber 62 and the setting of valve 64 will determine this time period. When pressure is experience at the outlet of line 66, the fluid stream into leg 32 will be deflected back into leg 34 causing a system recycling. As soon as the jet of fluid is transferred from leg 32, pressure falls in chamber 52 allowing the diaphragm to be recentered and switching elements 16, normally biased apart, to separate. The circuit to the motor 12 is thereby broken resulting in the stopping of the wiping action. The exact end position of the wipers can be controlled by the setting of valve 64 relative to the size of chamber 62 as well as by mechanical means, such as a cam driven by motor 12. Once the stream of fluid has been shifted back to leg 34, the time until the next motor energization is the dwell time and is controlled by the setting of adjustable orifice 46 and the size of capacitance 48.

The subject invention finds particular utility for reasons of economy when utilizing the exhaust system of a vehicle. The system is temperature insensitive because it is designed to operate on hot exhaust gases and ambient temperature changes are therefore not significant. The adjustable orifice 46 can be placed in the driving compartment of the vehicle accessible to the vehicle operator and, therefore, the cycling frequency of the subject wiping system is easily controllable as driving conditions change. Also to be noted is the fact that diaphragm 20 could be a metallic member which would respond to system pressure build-up and "oil can" toward the left as viewed in the drawing to move plunger 18. The sizes of the passages, lines and collectors in the subject invention can be tailored to a particular system to insure optimum performance of a pulsing control.

While the embodiment of the present invention, as herein disclosed, constitutes a preferred form, it is to be understood that other forms might be adopted.

What is claimed is as follows:

1. A windshield wiping system for wiping the windshield of a vehicle comprising: an electric drive motor which is adapted to be intermittently energized for moving a windshield wiper across the windshield through one cycle of operation each time it is energized, switch means in an electric circuit with said motor and which includes a member movable between an open position in which it effects de-energization of said circuit and a closed position in which it effects energization of said circuit; pressure responsive means including a movable element for effecting movement of said member from its open position toward its closed position in response to fluid under pressure being supplied to one side of said element and for effecting movement of said member from its closed position toward its open position when no fluid under pressure is being supplied to said one side of said element; a source of fluid under pressure; and fluid amplifier means having an inlet leg in communication with said source and a pair of outlet legs, one of said outlet legs being in communication with said one side of said element of said pressure responsive means, said fluid amplifier means further including feedback means for alternately switching the flow of fluid from one outlet leg to the other outlet leg and vice versa at periodic intervals, said fluid when switched to said one leg effecting operation of said pressure responsive means to move said movable member from its open position toward its closed position to effect energization of the motor and said fluid when switched to the other leg effecting operation of said pressure responsive means to effect movement of said member from its closed position toward its open position to de-energize the motor, said feedback means including flow control means for varying the frequency of the switching action and thereby the frequency of the cycle of operation of said windshield wiper.

2. A windshield wiping system as defined in claim 1 wherein said feedback means includes a pair of feedback circuits each having a flow control means and wherein said flow control means includes a settable valve means and a capacitance means in series in the respective feedback circuits.

3. A windshield wiping system as defined in claim 2 wherein said fluid source is the exhaust gases emanating from the engine of the vehicle.

References Cited

UNITED STATES PATENTS

| | | | |
|---|---|---|---|
| 1,205,530 | 11/1916 | Hall | 137—81.5UX |
| 2,987,747 | 6/1961 | Oishei et al. | 15—250.12UX |
| 3,111,291 | 11/1963 | Horton | 137—81.5 |
| 3,122,062 | 2/1964 | Spivak et al. | 137—81.5X |
| 3,185,166 | 5/1965 | Horton et al. | 137—81.5 |
| 3,219,901 | 11/1965 | Foreman et al. | 15—250.12X |
| 3,124,999 | 3/1964 | Woodward | 137—81.5X |
| 3,262,042 | 7/1966 | Amos | 318—443 |

OTHER REFERENCES

The Fluid Amplifier, by T. F. Sinclair, published by Radio-Electronics in February 1965; pages 44 to 46 incl.

Fluidics Made Easy, by Carlos Pinkstaff, published by Hydraulics & Pneumatics in March 1966; pages 90 and 91.

LAVERNE D. GEIGER, Primary Examiner

R. I. SMITH, Assistant Examiner

U.S. Cl. X.R.

15—250.12; 137—81.5